United States Patent
Morihashi et al.

(10) Patent No.: US 11,453,094 B2
(45) Date of Patent: Sep. 27, 2022

(54) SERVO CONTROLLER

(71) Applicant: FANUC CORPORATION, Yamanashi (JP)

(72) Inventors: Ryou Morihashi, Yamanashi (JP); Kenta Yamamoto, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 432 days.

(21) Appl. No.: 16/817,194

(22) Filed: Mar. 12, 2020

(65) Prior Publication Data
US 2020/0290168 A1    Sep. 17, 2020

(30) Foreign Application Priority Data
Mar. 15, 2019   (JP) .............................. JP2019-048475

(51) Int. Cl.
*B23Q 15/007*   (2006.01)
*B23Q 15/12*    (2006.01)
*G05B 19/414*   (2006.01)
*G05B 19/4062*  (2006.01)

(52) U.S. Cl.
CPC ......... *B23Q 15/0075* (2013.01); *B23Q 15/12* (2013.01); *G05B 19/4142* (2013.01); *G05B 19/4062* (2013.01)

(58) Field of Classification Search
None
See application file for complete search history.

(56) References Cited

U.S. PATENT DOCUMENTS 5,157,597 A * 10/1992 Iwashita .................. G05B 5/01
                                                        318/561

FOREIGN PATENT DOCUMENTS

| JP | 2014054689 A   | 3/2014  |
| JP | 2016-189039 A  | 11/2016 |
| JP | 2018005423 A   | 1/2018  |

OTHER PUBLICATIONS

An Office Action; "Notice of Reasons for Refusal", mailed by the Japanese Patent Office dated Jul. 20, 2021, which corresponds to Japanese Patent Application No. 2019-048475 and is related to U.S. Appl. No. 16/817,194; with English language translation.

* cited by examiner

*Primary Examiner* — Ryan A Jarrett
(74) *Attorney, Agent, or Firm* — Studebaker & Brackett PC

(57) ABSTRACT

A servo controller 20 includes: an oscillation command generating unit 23 that generates an oscillation command for causing the workpiece W and the tool 14 to relatively oscillate; at least one of a position control unit 22 that generates a position command for causing the workpiece W and the tool 14 to relatively move, a speed control unit 24 that generates a speed command for causing the workpiece W and the tool 14 to relatively move, and a current control unit 25 that generates a torque command for driving the plurality of axes; and a gain changing unit 21 that changes a control gain, in which the oscillation command generating unit 23 transmits a signal outputted when oscillating operation is started to the gain changing unit 21, and the gain changing unit 21 changes the control gain.

5 Claims, 4 Drawing Sheets

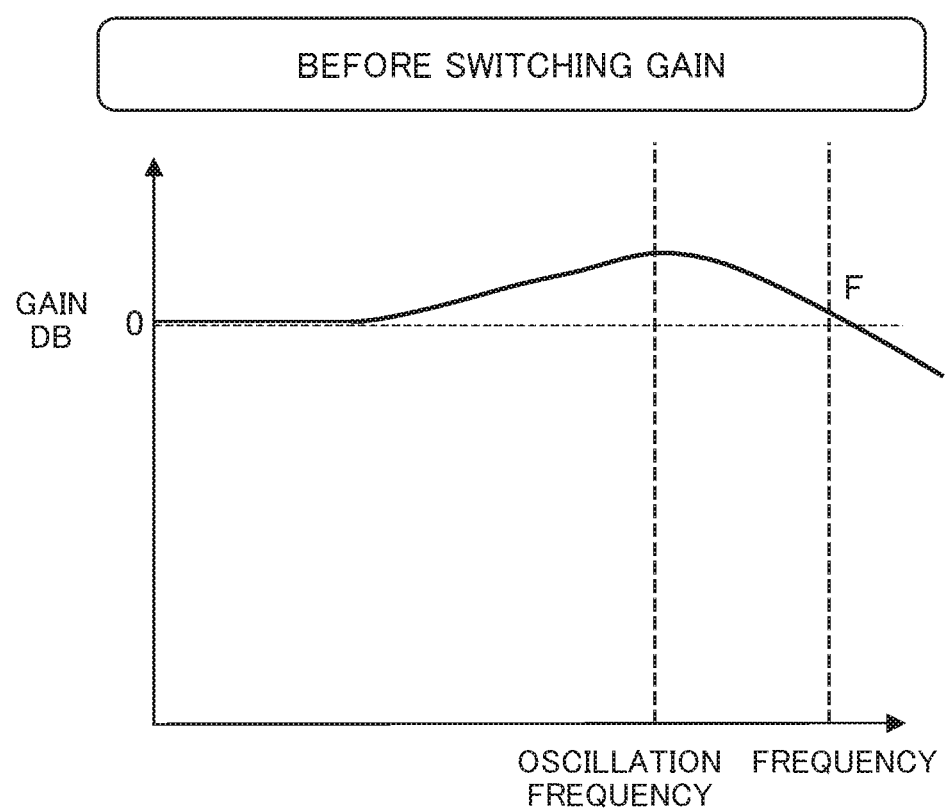

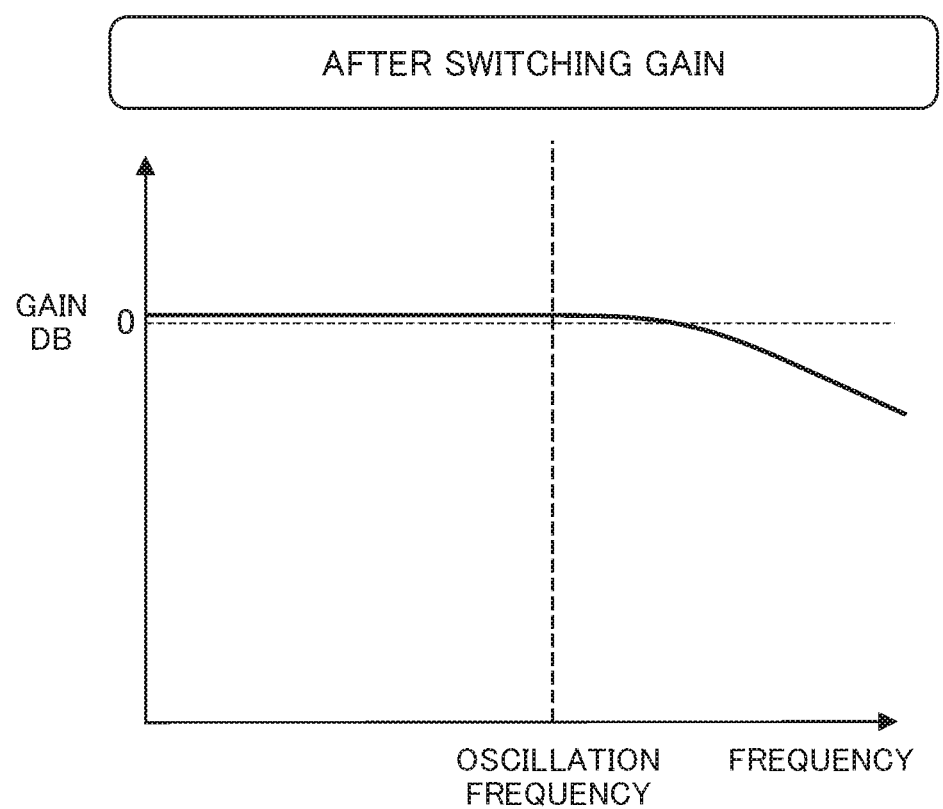

SERVO CONTROLLER

This application is based on and claims the benefit of priority from Japanese Patent Application No. 2019-048475, filed on 15 Mar. 2019, the content of which is incorporated herein by reference.

BACKGROUND OF THE INVENTION

Field of the Invention

The present invention relates to a servo controller.

Related Art

Conventionally, by causing a tool and a workpiece to relatively oscillate in the machining direction (oscillating operation), the oscillation machining for shredding the chips is known (e.g., see Japanese Unexamined Patent Application, Publication Nos. 2018-005423 and 2014-054689). Japanese Unexamined Patent Application, Publication No. 2018-005423 discloses that "in the tip nose path of the cutting tool 130, the machined portion upon moving forward at this time and the machined portion upon moving backward at the next time overlap, and, for example, since the peripheral surface shape of the workpiece W in the n+1$^{th}$ rotation of the spindle 100 includes the peripheral surface shape of the workpiece W in the n$^{th}$ rotation of the spindle 110, idle operation of the cutting tool 130 occurs which does not machine the workpiece W. During this idle operation, the chips generated from the workpiece W are shredded. The machine tool 100 smoothly machines the workpiece W to form the outer shape, etc., while shredding the chips".

Furthermore, Japanese Unexamined Patent Application, Publication No. 2014-054689 discloses that "a detailed description will be given of a control device 8 with reference to FIGS. 2 and 3. As shown in FIG. 2, the control device 8 includes: a central control unit 80 including a CPU and the like; an input unit 81 including a touch screen and the like; a program information storage unit 82 that stores program information programmed by the user using the input unit 81; a vibration cutting information storage unit 83 that stores practically operable data that does not allow for oscillation even with a gain value set to high gain, and that oscillates with low frequency the cutting tool 4 according to the mass on a table, or the mechanical characteristic such as motor characteristics; a motor control unit 84 that controls the operation of the cutting tool feed drive motor 7a via the servo amplifier 9; and a display unit 85 including a liquid crystal monitor, etc.".

Patent Document 1: Japanese Unexamined Patent Application, Publication No. 2018-005423
Patent Document 2: Japanese Unexamined Patent Application, Publication No. 2014-054689

SUMMARY OF THE INVENTION

It is desirable to perform stable machining in oscillation machining.

It is an object of the present invention to provide a servo controller that enables stable machining in the oscillation machining.

According to an aspect of the present disclosure, a servo controller which controls a machine tool that turns a workpiece by cooperative operation of a plurality of axes, the servo controller includes: an oscillation command generating unit that generates an oscillation command for causing the workpiece and the tool to relatively oscillate; at least one of a position control unit that generates a position command for causing the workpiece and the tool to relatively move, a speed control unit that generates a speed command for causing the workpiece and the tool to relatively move, and a current control unit that generates a torque command for driving the plurality of axes; and a gain changing unit that changes a control gain, in which the oscillation command generating unit transmits a signal outputted when oscillating operation is started to the gain changing unit, and the gain changing unit changes the control gain.

According to the present invention, it is possible to provide a servo controller that enables the stable machining in the oscillation machining.

BRIEF DESCRIPTION OF THE DRAWINGS

FIG. 3 is a graph showing a gain in a state before switching a control gain in the oscillating operation; and FIG. 4 is a graph showing a gain in a state after switching a control gain in the oscillating operation.

DETAILED DESCRIPTION OF THE INVENTION

In the following, an example of an embodiment of the present invention will be described with reference to the attached drawings. It should be noted that the same reference symbols will be attached to identical or corresponding portions in the respective drawings.

Figure 1:
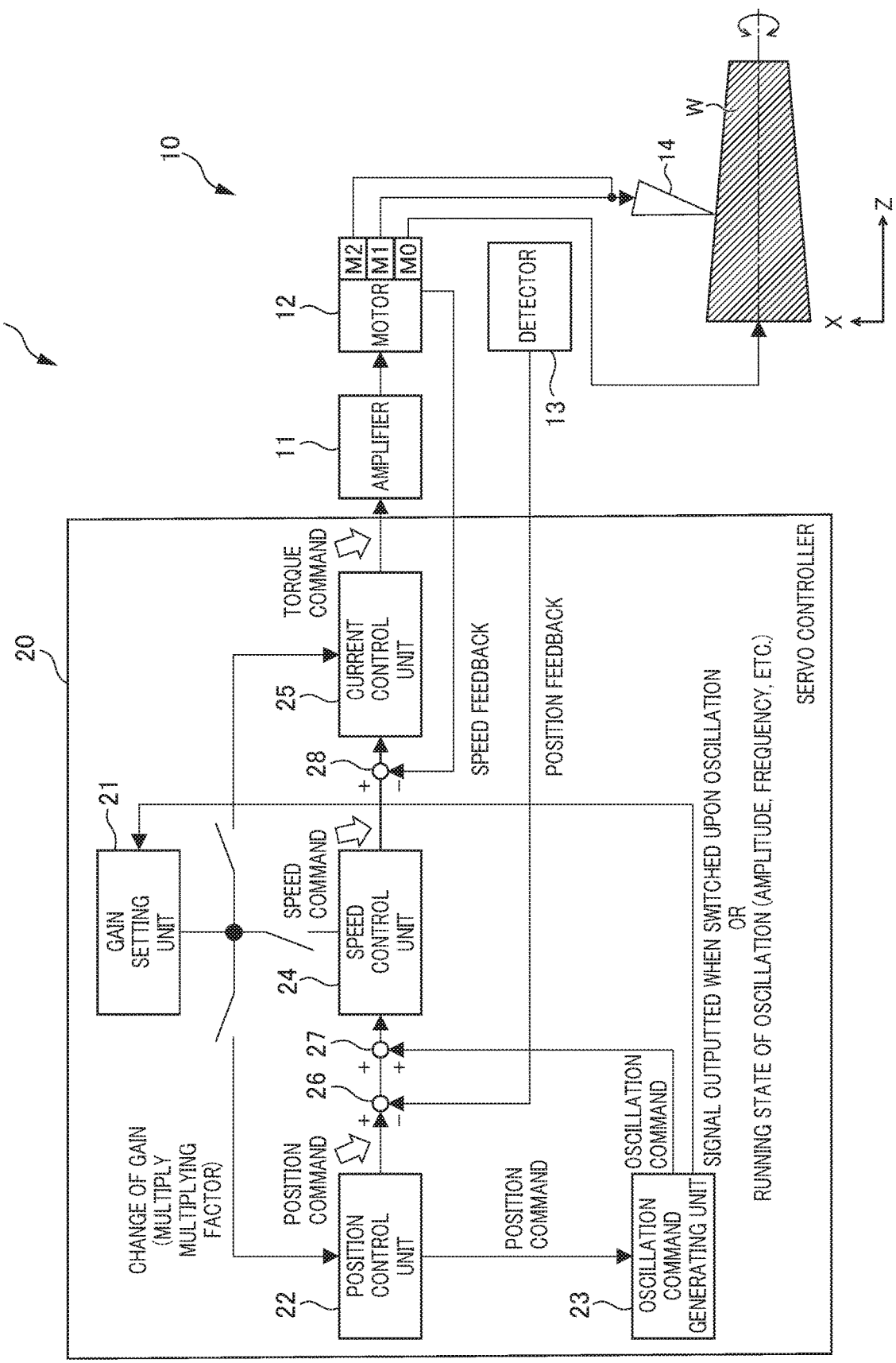
FIG. 1 is a diagram showing the configuration of a machining system including a servo controller of a machine tool according to the present embodiment.

FIG. 1 is a diagram showing the configuration of a machining system 1 including a servo controller 20 of a machine tool 10. The machining system 1 shown in FIG. 1 includes a machine tool 10 and a servo controller 20 for controlling the machine tool 10.

The machine tool 10 includes a tool 14. The tool 14 turns a workpiece W having, for example, a cylindrical, columnar, conical, or frustoconical shape. In the example of FIG. 1, the tool 14 turns the outer peripheral surface of the workpiece W. In the example of FIG. 1, the center axis line of the workpiece W serving as the rotation axis of the workpiece W is shown as the Z-axis, and the axis line perpendicular to the Z-axis is shown as the X-axis.

The shape in the direction along the Z-axis which the machine tool 10 machines is not limited to a linear one, and the machine tool 10 is also able to machine the workpiece W having a tapered shape or an arc shape. Furthermore, the machine tool 10 is not limited to machining the outer peripheral surface of the workpiece W, and it is also possible to machine the inner peripheral surface of the workpiece W such as a cylindrical shape. Furthermore, the machine tool 10 is not limited to turning, and it is also possible to perform machining such as cutting, lapping, grinding, or polishing.

The machine tool 10 includes a spindle M0 as a motor 12, and two feed shafts M1 and M2 that cooperate with the spindle M0. The spindle M0 includes a spindle motor, and the feed shafts M1 and M2 include servo motors. The spindle M0 and the feed shafts M1 and M2 are controlled by the servo controller 20.

The spindle M0 causes the workpiece W to rotate around the center axis line (the Z-axis) of the workpiece W. The feed shaft M1 is able to perform both feeding of the tool 14 in the Z-axis direction (the first direction) and a reciprocating motion (i.e., oscillation) of the tool 14 in the Z-axis direction. The feed shaft M2 is able to perform both feeding of the tool 14 in the X-axis direction (the second direction) and the reciprocating motion (i.e., oscillation) of the tool 14 in the X-axis direction.

When turning a cylindrical or columnar workpiece W, the workpiece W is made to rotate around the center axis line (the Z-axis) of the workpiece W, and the tool 14 is fed only in the Z-axis direction (the machining direction in this case) along the generating line of the outer peripheral surface of the workpiece W.

On the other hand, when turning the workpiece W having a different outside diameter in the Z-axis direction such as the workpiece W having an arc shape, the workpiece W is made to rotate around the center axis line (the Z-axis) around the workpiece W, and the tool 14 is fed in an oblique direction along the generating line of the outer peripheral surface of the workpiece W (the composite direction of the Z-axis direction and the X-axis direction) (the machining direction in this case). In this case, in order to feed the tool 14 in an oblique direction along the generating line of the outer peripheral surface of the workpiece W, at least two feed shafts M1 and M2 are required. By controlling both the feed shaft M1 and the feed shaft M2, the tool 14 is fed in the oblique direction along the generating line of the outer peripheral surface of the workpiece W.

The servo controller 20 is configured by a computer including memory such as ROM (read only memory) and RAM (random access memory), a CPU (central processing unit), and a communication control unit which are connected to each other via a bus. The servo controller 20 includes a position control unit 22, an oscillation command generating unit 23, a speed control unit 24, a current control unit 25, and a storage unit (not shown), and the function or the operation of each component is achieved with the cooperation between the CPU and the memory mounted on the computer, and the control program stored in the memory.

For example, machining conditions of the workpiece W are stored in the storage unit (not shown). The machining conditions of the workpiece W include, for example, the relative rotational speed of the workpiece W and the tool 14 around the center axis of the workpiece W, the relative feedrate of the tool 14 and the workpiece W, and the position command of the feed shaft M1 and M2, etc.

A host computer (not shown) such as a CNC (Computer Numerical Controller), PLC (Programmable Logic Controller), etc., is connected to the servo controller 20, and the aforementioned rotational speed and feedrate may be inputted from the host computer to the storage unit (not shown). Furthermore, the storage unit or the position control unit 22 (not shown) is not necessarily provided in the servo controller 20, and thus may be provided in the abovementioned host computer.

Furthermore, the storage unit (not shown) stores a machining program to be executed by the machine tool 10, and it may be configured such that the CPU (not shown) in the servo controller 20 reads, as the machining conditions, the abovementioned rotational speed and the feedrate from the machining program, and outputs them to the position control unit 22 and the oscillation command generating unit 23.

The position control unit 22 creates a position command for causing the workpiece W and the tool 14 to move relatively. More specifically, the position control unit 22 serves to create the position command of the feed shafts M1 and M2 on the basis of the relative rotational speed of the workpiece W and the tool 14 around the center axis line of the workpiece W, and the relative feedrate of the tool 14 and the workpiece W. This position command is a command to instruct a target position when relatively feeding the tool 14 and the workpiece W in a direction along the generating line of the outer peripheral surface of the workpiece W (the machining direction).

The oscillation command generating unit 23 uses a position command from the position control unit 22 to generate an oscillation command to cause the workpiece W and the tool 14 to relatively oscillate. More specifically, the oscillation command generating unit 23 creates an oscillation command of the feed shaft M1 so that, on the basis of the abovementioned rotational speed and the abovementioned feedrate, the rotational speed becomes an oscillation frequency of a positive non-integral multiple, and the tool 14 intermittently cuts the workpiece W. The oscillation command is a periodic command which is created so as to be asynchronous with respect to the rotational speed around the center axis described above, and includes the oscillation frequency and the oscillation amplitude. That is, the running state of the oscillating operation is represented by the oscillation frequency or the oscillation amplitude. The value by the term of S/60×I in Equation (1) of the oscillation command to be described later corresponds to the oscillation frequency, the value by the term of K×F/2 in Equation (1) corresponds to the oscillation amplitude.

Herein, intermittent cutting indicates that the tool 14 turns the workpiece W while the tool 14 comes into contact with and separates from the workpiece W periodically, and is also referred to as oscillation cutting or vibration cutting. Furthermore, in FIG. 1, although the workpiece W rotates and the tool 14 oscillates with respect to the workpiece W, it may be configured such that the tool 14 rotates around the center axis line of the workpiece W, and the workpiece W oscillates with respect to the tool 14. Furthermore, in FIG. 1, although both the feed operation and the oscillating operation of the workpiece W are performed by one feed shaft M1, M2, it may be configured so as to perform the feed operation and the oscillating operation of the workpiece W by different feed shafts, respectively.

A subtractor 26 calculates a position deviation between a position command from the position command unit and a position feedback detected by a detector 13. An adder 27 calculates the position deviation by adding the position command and the oscillation command from the oscillation command generating unit 23. The position command, the oscillation command, and the position deviation thus added are supplied to the speed control unit 24 as a composite command.

The speed control unit 24 calculates a speed command from the position deviation obtained by adding the oscillation command. A subtractor 28 subtracts a speed feedback detected by an encoder (not shown) of the motor from the speed command from the speed command unit to create a speed deviation, and supplies it to a current control unit 25.

The current control unit 25 creates a torque command from the speed command and the speed deviation and inputs it to the amplifier 11. The amplifier 11 supplies the torque command converted by the current control unit 25 to the feed shaft M1. On the basis of such a command, the feed shaft M1 is controlled. The feed shaft M1 is provided with the detector 13 configured by an encoder, and the detector 13 supplies an actual position of the feed shaft M1 as a feedback to the subtractor 26 while the feed shaft M1 is rotating. In a case in which any difference between the position command value and the position feedback value according to the composite command no longer exists, the actual position of the feed shaft M1 reaches the position command value.

A gain setting unit 21 sets a servo gain of the servo motor of the feed shafts M1 and M2. Regarding the setting of the servo gain, by receiving a signal outputted upon the start of the oscillating operation from the oscillation command generating unit 23 when the mode is switched from normal cutting to the oscillation cutting, it is possible to change at least one of a position gain of the position control unit 22, a speed gain of the speed control unit 24, and a current gain of the current control unit 25, as a control gain to be described later. The gain setting unit 21 changes the value of the gain by changing a multiplying factor (the control gain) to be multiplied by the gain to be described later. A parameter set in advance is used as the multiplying factor, or the multiplying factor is calculated by taking into consideration both the running state of the oscillating operation and the gain after the change by the gain setting unit 21, thereby considering the magnitude of the multiplying factor for multiplication. At this time, for example, the running state of the oscillating operation is recognized by referring to a value represented by the oscillation frequency or the amplitude of the oscillation.

Figure 2:
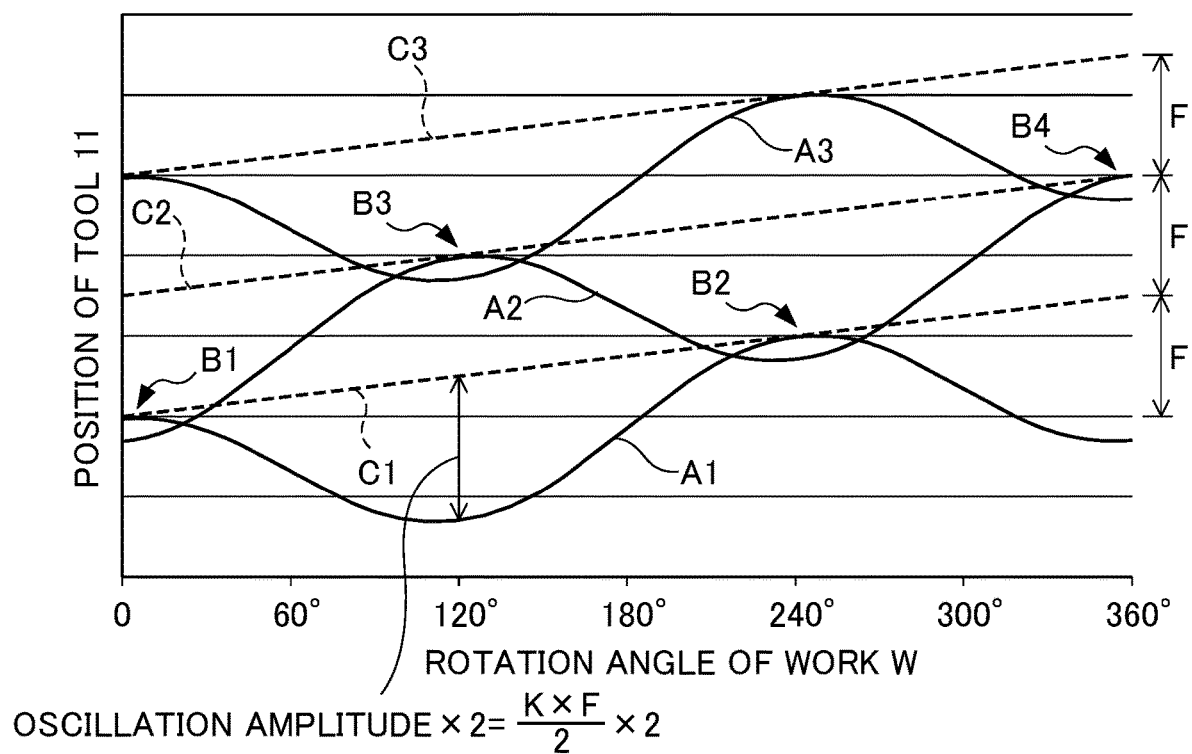
FIG. 2 is a diagram showing the relationship between a feed amount and a rotation angle in oscillating operation.

Hereinafter, a description will be given of the oscillation command generating unit 23. FIG. 2 is a diagram showing the relationship between a feed amount and a rotation angle in the oscillating operation. The horizontal axis in FIG. 2 shows the rotation angle of the workpiece W, and the vertical axis shows the feed amount of the tool 14 in the machining direction (i.e., the direction along the generating line of the outer peripheral surface of the workpiece W in FIG. 1). A plurality of linear broken lines C1, C2, C3 . . . extending in the diagonal direction is shown in FIG. 2.

As shown in FIG. 2, the vertical axis coordinate of the intersection point between the broken line C1 and the vertical axis corresponds to the vertical axis coordinate at the starting point of the next broken line C2. Similarly, the vertical axis coordinate of the intersection point between the broken line C2 and the vertical axis corresponds to the vertical axis coordinate at the starting point of the next broken line C3. The plurality of linear broken lines C1, C2, C3 . . . shows the trajectory of the tool 14 in the workpiece W in the case of no oscillation command. On the other hand, the curves A1, A2, A3 . . . shown in FIG. 2 show the trajectory of the tool 14 on the workpiece W in the case of the oscillation command. That is, the broken lines C1, C2, C3, etc. show only the position command before the oscillation command is added (the original command value), and the curves A1, A2, A3, etc. indicate the position command after the oscillation command is added. Therefore, the curves A1, A2, and A3 show a command obtained by adding a cosine-shaped oscillation command to each position command represented by the broken lines C1, C2, and C3.

Furthermore, the curve A1 is the trajectory of the tool 14 in the first rotation of the workpiece W, the curve A2 is the trajectory of the tool 14 in the second rotation of the workpiece W, and the curve A3 is the trajectory of the tool 14 in the third rotation of the workpiece W. For the purpose of simplicity, the trajectory of the tool 14 after the fourth rotation of the workpiece W is not shown.

The oscillation command generating unit 23 calculates the oscillation command in the following manner. In order to calculate a command such as the curves A1, A2, and A3 with each of the broken lines C1, C2, and C3, which are the position commands of the feed shafts M1 and M2 calculated by the position control unit 22 as a reference axis line, the oscillation command generating unit 23 determines the oscillation frequency. S/60×I in Equation (1) to be described later becomes the oscillation frequency.

In a case of determining the abovementioned oscillation frequency, as shown in FIG. 2, it is preferable that the initial phase of the cosine-shaped curve A2 with a certain broken line, for example, the broken line C2 as a reference axis, is shifted by a half cycle with respect to the cosine-shaped curve A1 with one previous broken line, for example, the broken line C1 as a reference axis. The reason is that, in the case of being shifted by a half cycle, the oscillation amplitude of the oscillation command can be minimized, as a result of which, it is possible to shred the chips most efficiently.

In order to calculate a command such as the curves A1, A2, and A3 with each of the broken lines C1, C2, and C3 as a reference axis line, the oscillation command generating unit 23 determines the oscillation amplitude of the oscillation command described above. The value according to the term K×F/2 in Equation (1) to be described later becomes the oscillation amplitude. The curve A1 and the curve A2 shown in FIG. 2 overlap with each other at the location B1 where the rotation angle is about 0 degrees and at the location B2 where the rotation angle is about 240 degrees. As can be seen from FIG. 2, at the locations B1 and B2, the maximum value of the curve A1 with respect to the broken line C1 is larger than the minimum value of the curve A2 with respect to the broken line C2. In other words, it is desirable for the oscillation command generating unit 23 to determine the oscillation amplitude so that the previous curve A1 and the subsequent curve A2 partially overlap with each other. It should be noted that, since the feedrate is constant in the curves A1, A2, and A3, the oscillation amplitudes of each oscillation command are all the same.

In this overlapping portions B1 and B2, since the tool 14 is spaced from the workpiece W while machining in the trajectory of the curve A2, the workpiece W is not machined. In the present embodiment, since such overlapping portions B1 and B2 are generated periodically, it is possible to perform so-called intermittent cutting. In the example shown in FIG. 2, the chips are generated at the locations B1 and B2, respectively by the operation according to the curve A2. In other words, two chips are generated in the curve A2 in the second rotation. Since such intermittent cutting is performed periodically, it is possible to perform vibration cutting periodically.

Furthermore, the curve A3 formed with respect to the broken line C3 is the same shape as the curve A1. The curve A2 and the curve A3 overlap with each other at the location B3 where the rotation angle is about 120 degrees and at the location B4 where the rotation angle is about 360 degrees. The chips are generated at the locations B3 and B4 respectively by the operation according to the curve A3. In other words, two chips are generated in the curve A3 in the third rotation. Thereafter, two chips are generated every one rotation of the workpiece W. However, chips are not generated in the first rotation.

By defining the oscillation frequency and the oscillation amplitude in this way, the oscillation command generating unit 23 calculates the oscillation command. For example, the oscillation command is expressed as shown in Equation (1) below.

[Math. 1]

$$\text{OSCILLATION COMMAND} = \frac{K \times F}{2} \cos\left(2\pi \times \frac{S}{60} \times I \times t\right) - \frac{K \times F}{2} \quad (1)$$

In Equation (1), K is an oscillation amplitude multiplying factor, F is a moving amount of the tool 14 per rotation of the workpiece W, that is, the feed amount per rotation [mm/rev], S is a rotation speed around the center axis of the workpiece W [min-1], or [rpm], and I is an oscillation frequency multiplying factor. Here, the abovementioned oscillation frequency corresponds to the term of S/60×I in Equation (1), and the abovementioned oscillation amplitude corresponds to the term of K×F/2 in Equation (1). However, the oscillation amplitude multiplying factor K is a number of 1 or more, and the oscillation frequency multiplying factor I is a non-integer greater than zero (for example, a positive non-integer such as 0.5, 0.8, 1.2, 1.5, 1.9, 2.3, or 2.5). The oscillation amplitude multiplying factor K and the oscillation frequency multiplying factor I are constants (in the example of FIG. 2, I is 1.5).

The reason why the oscillation frequency multiplying factor I is not an integer is, in a case of the oscillation frequency becoming exactly the same as the rotation speed around the center axis of the workpiece W, it is not possible to generate the overlapping locations B1, B2, B3, B4, etc. described above, and thus, the shredding effect of the chips owing to the oscillation cutting cannot be obtained.

Furthermore, according to Equation (1), the oscillation command is a command in which the term (K×F/2) is subtracted as an offset value with respect to a cosine wave with each of the broken lines C1, C2, and C3 indicating the position command as a reference axis line. Therefore, it is possible to control the position trajectory of the tool 14 based on the composite command value obtained by adding the oscillation command to the position command, with the position according to the position command in the machining direction of the tool 14 as an upper limit. Therefore, the curves A1, A2, A3 and the like in FIG. 2 do not exceed the broken lines C1, C2, C3 and the like in the + direction (i.e., the machining direction of the tool 14).

Furthermore, by defining the oscillation command as represented by Equation (1), as can be seen from the curve A1 in FIG. 2, it is configured such that a large oscillation does not appear from the beginning in the feed direction of the tool 14 at the machining starting point (the position of 0 degrees of the horizontal axis).

It should be noted that the initial values of the respective parameters (K and I in Equation (1)) which are adjusted when the oscillation frequency and the oscillation amplitude are determined are stored in a storage unit (not shown) before the operation of the machine tool 10. The rotation speed (S) of the workpiece W is stored in advance as a machining condition in the storage unit (not shown). The feed amount per rotation F is calculated from the rotation speed (S) and the position command created by the position control unit 22.

For example, in a case in which the machined workpiece has a cylindrical shape or a columnar shape, the oscillation is performed along the machining direction which is the direction of the feed shaft M1 (Z-axis) along the generating line of the outer peripheral surface of the workpiece W. On the other hand, in a case in which the machined workpiece has a conical shape, a truncated cone shape (tapered shape), or an arc shape, the oscillation is performed along an oblique direction along the generating line of the outer peripheral surface of the workpiece W, i.e., along the machining direction which is a composite direction of the direction of the feed shaft M1 (Z-axis) and the direction of the feed shaft M2 (X-axis).

Next, a description will be given of the change in gain by the gain setting unit 21. Here, gain refers to the control gain. More specifically, in order to calculate the operation amount to attempt to eliminate the speed deviation in the speed control, the speed deviation is amplified in a compensator (not shown). Upon the amplification, multiplication and integration is performed in the compensator, whereby the calculation according to the control gain is performed. Thereafter, after calculating the operation amount, the calculated operation amount is inputted to the control target. Thereafter, the feedback by this is obtained as a response. The ratio of this input and response at each frequency is referred to as a gain in the following description, and the amplification ratio used upon amplifying the deviation in order to calculate the abovementioned operation amount is referred to as a control gain in the following description. If the control gain is set too large, the oscillation or overshoot is likely to occur.

In terms of the position gain of the position control unit 22, the speed gain of the speed control unit 24, and the current gain of the current control unit 25, in a case in which the oscillation cutting is started to perform the oscillating operation with the control gain during the normal cutting, the position accuracy of the tool 14 becomes unstable, and thus, the operation is likely to become unstable. This is because, normally speaking, in order to improve the responsiveness of the high-precision servo, high control gain is often set during the normal cutting. For this reason, the value of the gain in the oscillation frequency becomes the absolute value away from 0 dB.

When switching from the normal cutting to the oscillation cutting in the machine tool 10, i.e., when the oscillating operation is started, a signal notifying that the oscillating operation is started is sent to the gain setting unit 21 from the oscillation command generating unit 23. More specifically, as shown in FIG. 3, in order to be able to maintain the accuracy even by driving at a high frequency while the normal cutting is being performed, it is set such that the point P at which the gain having good trackability becomes 0 dB becomes a high value. Here, in a case of the frequency characteristic in the speed gain, the range in which the good trackability is maintained is up to the value of the gain of −3 dB, and the trackability becomes favorable by setting the value of the gain to a value as close as possible to 0 dB. FIG. 3 is a graph showing a state before switching the control gain in the oscillating operation.

However, in a state of performing the normal cutting, as shown in FIG. 3, the value of the gain is a value away from 0 dB in the oscillation frequency for performing the oscillation cutting. In a case of switching from the normal cutting to the oscillation cutting in the machine tool 10, a signal notifying that the oscillating operation was started is sent to the gain setting unit 21 from the oscillation command generating unit 23. With such a configuration, as shown in FIG. 4, the gain setting unit 21 lowers and changes the value of the speed gain so as to be close to 0 dB, and supplies the speed gain to the speed control unit 24. Thus, the value of the gain in the oscillation frequency becomes close to 0 dB, the trackability of the tool 14 in the oscillating operation is improved, and the position accuracy of the tool 14 is stabilized, a result of which the operation is stabilized. FIG. 4 is a graph showing a state after switching the control gain in the oscillating operation.

The present embodiment described above has the following such effects. In the present embodiment, the oscillation command generating unit 23 transmits a signal outputted when the oscillating operation is started to the gain setting unit 21 that configures a gain changing unit, and the gain setting unit 21 changes the control gain. With such a configuration, it is possible to set the value of the gain in the oscillation frequency as close as possible to 0 dB.

Furthermore, in the present embodiment, the running state of the oscillating operation is represented by frequency or amplitude. Thus, by changing the control gain so that the value of the gain in the oscillation frequency is close to 0 dB, it is possible to increase the trackability of the amplitude of the oscillation.

Furthermore, in the present embodiment, the gain changing unit changes at least one of the position gain of the position control unit 22, the speed gain of the speed control unit 24, and the current gain of the current control unit 25, as the control gain, and for example, the gain changing unit changes only the speed gain in the speed control unit 24.

With such a configuration, for example, in the case of performing current control by changing the current gain, since the communication from the motor is not substantially delayed, the frequency band in which the value of the gain is responsive at 0 dB is wide and thus unlimited; however, it is difficult to handle because it also picks up resonance points. However, it is possible to easily perform control by changing only the speed gain without such difficult-to-handle current control.

Furthermore, in the present embodiment, the gain changing unit changes the control gain so that the value of the gain in the oscillation frequency is set to be closer to 0 dB. With such a configuration, the trackability of the tool 14 to perform the oscillation cutting becomes favorable, and it is possible to perform the machining stably in the oscillation cutting.

The present embodiment has been described above. The abovementioned embodiment is a preferred embodiment; however, the present invention is not limited to only the above embodiment, and it is possible to implement the present invention in variously modified modes of the embodiment. For example, it is possible to implement the present invention in a modified mode as in modifications described below.

That is, the configurations of the oscillation command generating unit, position control unit, speed control unit, current control unit, gain changing unit and the like are not limited to the configurations of the oscillation command generating unit 23, the position control unit 22, the speed control unit 24, the current control unit 25, the gain setting unit 21, and the like. Furthermore, in the above embodiment, the gain setting unit 21 changes the speed gain in the speed control unit 24; however, the present invention is not limited to this configuration. It suffices if the gain changing unit having the gain setting unit 21 changes at least one of the position gain of the position control unit 22, the speed gain of the speed control unit 24, and the current gain of the current control unit 25 and, for example, may change three of them. Furthermore, in the above embodiment, the gain setting unit 21 configuring the gain changing unit lowers and changes the value of the speed gain so as to set the value of the gain in the oscillation frequency as close as possible to 0 dB; however, the present invention is not limited to this configuration. For example, in a case in which high accuracy is required for cutting when the value of the gain in the oscillation frequency is low, the gain changing unit may change to increase at least one of the position gain, the speed gain, and the current gain so as to set the value of the gain in the oscillation frequency as close as possible to 0 dB.

EXPLANATION OF REFERENCE NUMERALS

14 tool
20 servo controller
21 gain setting unit
22 position control unit
23 oscillation command generating unit
24 speed control unit
25 current control unit
W work

What is claimed is:

1. A servo controller which controls a machine tool that turns a workpiece by cooperative operation of a plurality of axes, the servo controller comprising:
   an oscillation command generating unit that generates an oscillation command for causing the workpiece and the tool to relatively oscillate;
   at least one of
   a position control unit that generates a position command for causing the workpiece and the tool to relatively move,
   a speed control unit that generates a speed command for causing the workpiece and the tool to relatively move, and
   a current control unit that generates a torque command for driving the plurality of axes; and
   a gain changing unit that changes a control gain,
   wherein the servo controller transmits a signal outputted when oscillating operation is started to the gain changing unit, and the gain changing unit changes the control gain.

2. The servo controller according to claim 1, wherein a running state of the oscillating operation is represented by frequency or amplitude.

3. The servo controller according to claim 1, wherein the gain changing unit changes at least one of a position gain of the position control unit, a speed gain of the speed control unit, and a current gain of the current control unit, as the control gain.

4. The servo controller according to claim 3, wherein the gain changing unit changes only the speed gain of the speed control unit.

5. The servo controller according to claim 1, wherein the gain changing unit changes the control gain so as to set a value of a gain in an oscillation frequency to be close to 0 dB.

* * * * *